US009015292B2

(12) United States Patent
Sathish (10) Patent No.: US 9,015,292 B2
(45) Date of Patent: Apr. 21, 2015

(54) METHOD, APPARATUS AND COMPUTER PROGRAM PRODUCT FOR PROVIDING COMPOSITE CAPABILITY INFORMATION FOR DEVICES IN DISTRIBUTED NETWORKS

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 877 days.

(21) Appl. No.: 12/575,254

(22) Filed: Oct. 7, 2009

(65) Prior Publication Data

US 2010/0100620 A1  Apr. 22, 2010

Related U.S. Application Data

(60) Provisional application No. 61/196,426, filed on Oct. 17, 2008.

(51) Int. Cl.
*G06F 15/177* (2006.01)
*H04W 8/22* (2009.01)
*H04L 29/08* (2006.01)
*H04L 29/06* (2006.01)
*H04W 88/02* (2009.01)

(52) U.S. Cl.
CPC ............... *H04W 8/22* (2013.01); *H04W 88/02* (2013.01); *H04L 67/2823* (2013.01); *H04L 69/24* (2013.01); *H04L 67/16* (2013.01); *H04L 67/303* (2013.01); *H04L 67/10* (2013.01)

(58) Field of Classification Search
USPC .................................................. 709/224, 225
See application file for complete search history.

(56) References Cited

U.S. PATENT DOCUMENTS

| 6,640,098 | B1* | 10/2003 | Roundtree | ................. | 455/414.2 |
| 7,660,852 | B2* | 2/2010 | Flannery et al. | ............. | 709/204 |
| 2005/0015474 | A1 | 1/2005 | Kavacheri et al. | | |
| 2005/0088980 | A1* | 4/2005 | Olkkonen et al. | ............ | 370/255 |
| 2006/0007900 | A1* | 1/2006 | Sylvain | ......................... | 370/338 |

(Continued)

FOREIGN PATENT DOCUMENTS

WO    2005064957 A1    7/2005

OTHER PUBLICATIONS

International Search Report and Written Opinion, PCT/FI2009/050767, Dec. 18, 2009, pp. 1-14.

(Continued)

*Primary Examiner* — Mohamed Ibrahim
(74) *Attorney, Agent, or Firm* — Ditthavong & Steiner, P.C.

(57) ABSTRACT

An apparatus for providing distribution of composite capability information for devices within a distributed network may include at least one processor and at least one memory including computer program code. The memory and the computer program code may be configured to, with the processor, cause the apparatus at least to receive local capability information from a participant device in a distributed network in which the local capability information describes the capabilities of the participant device, combine the local capability information from the participant device with other capability information defining capabilities of other participant devices to produce composite capability information, generate differential information indicating differences between the local capability information and the composite capability information, and provide the differential information to the participant device. A corresponding method and computer program product are also provided.

20 Claims, 6 Drawing Sheets

(56) References Cited

U.S. PATENT DOCUMENTS

| | | | |
|---|---|---|---|
| 2007/0005990 A1* | 1/2007 | Sathish | 713/189 |
| 2007/0067310 A1* | 3/2007 | Gupta et al. | 707/10 |
| 2007/0153832 A1 | 7/2007 | Walsh | |
| 2007/0198663 A1* | 8/2007 | Helander | 709/220 |
| 2009/0281862 A1* | 11/2009 | Conescu et al. | 705/8 |
| 2009/0300724 A1* | 12/2009 | Cho et al. | 726/4 |
| 2010/0061316 A1* | 3/2010 | Levenshteyn et al. | 370/329 |

OTHER PUBLICATIONS

Sathish, S. et al. Supporting Smart Space Infrastructures: A Dynamic Context-Model Composition Framework, Aug. 2007, pp. 1-6, vol. 329, ICST.

Extended European Search Report for corresponding European Application No. 09820309.4, dated Nov. 12, 2014, 9 pages.

* cited by examiner

METHOD, APPARATUS AND COMPUTER PROGRAM PRODUCT FOR PROVIDING COMPOSITE CAPABILITY INFORMATION FOR DEVICES IN DISTRIBUTED NETWORKS

CROSS REFERENCE TO RELATED APPLICATION

This application claims the benefit of U.S. Provisional Application No. 61/196,426, filed Oct. 17, 2008, the contents of which are incorporated herein in its entirety.

TECHNOLOGICAL FIELD

Embodiments of the present invention relate generally to network communication technology and, more particularly, relate to a method, apparatus and computer program product for providing distribution of composite capability information for devices within a distributed network.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of information sharing in various networks. Although there are numerous types of networks that may be utilized for sharing information, it is becoming more popular recently to share information via decentralized networks. A decentralized network may generally be considered a network that operates in a distributed environment rather than a centralized control environment. Thus, network resources such as processors, memory, switching devices, etc., may be distributed throughout the network instead of being centralized at one location (e.g., a server or server bank). As such, for example, various devices may come and go from the network at random times. A peer-to-peer (P2P) network is one example of an ad hoc or decentralized network. P2P networks rely primarily on the computing power and bandwidth of the devices or nodes (i.e., peers) within the network. Accordingly, P2P networks generally do not concentrate computing power and bandwidth within servers.

Each device is typically able to host a representation of, for example, its own capabilities as a hierarchical structure. In a typical decentralized network, a user associated with a device entering the network may wish to make services supported by the device available via the network. Alternatively, the user may wish to discover services that are available via the network. An environment in which devices are easily able to enter and leave the network with little configuration is sometimes known as a "smart space". In a smart space, users may enter into an environment and join the network to share or use resources without significant configuration set up overhead that requires extensive user involvement. As such, for example, in a multi-device scenario in which two or more devices are brought into communication with each other, it may be desirable to obtain certain information related to device capabilities and/or applications running on each respective device (e.g., the hierarchical structure representing the capabilities of each respective device). However, doing so may currently be hindered by the use of proprietary extensions and requirements for predefined knowledge of participating devices.

Given the ubiquitous nature of mobile terminals, such as mobile phones and numerous other mobile electronic devices, network communications (including communication in both centralized and decentralized networks) are becoming more common. As such, developments relating to smart spaces and other similar environments may be desirable for enhancing user experiences.

BRIEF SUMMARY OF SOME EXAMPLES OF THE INVENTION

A method, apparatus and computer program product are therefore provided to enable providing formation of smart spaces and the provision of information from participant devices to enable a composite capability to be determined in a manner that is customized for each respective device. In this regard, for example, exemplary embodiments of the invention may provide for utilization of a Delivery Context Client Interface (DCCI) to represent capability information for devices in communication via the network to enable the building of a composite tree for each device to show the combined capabilities available via the network.

Embodiments of the invention may provide a method, apparatus and computer program product for use, for example, in mobile environments. As a result, for example, mobile terminal users may enjoy an improved capability for participation in or communication within smart spaces or other networks.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Embodiments of the present invention may provide a mechanism by which device capability information associated with a particular user's device may be utilized for composite capability tree generation. The composite capability tree may then be used to provide device specific information to each device in the network to enable the respective devices to see the composite capability of all devices that participate to make up the composite tree.

Electronic devices have been rapidly developing in relation to their communication capabilities. As the capabilities of such devices have increased, applications that are sensitive to the capabilities of the devices have also been developed. Thus, for example, applications that are sensitive to the current operating state or context of devices have been developed. The devices are often able to determine, keep and communicate information about their own current operating state. For example, battery level, available bandwidth, certain device settings, hardware and software capabilities, local ambient light level and many other state related pieces of information may be determined and/or communicated to other devices. In order to communicate information on device operating state to various applications such as, for example, an application associated with accessing the web, an interface may be provided. An example of such an interface is a Delivery Context Client Interface (DCCI), which is a World Wide Web Consortium (W3C) specification. DCCI may enable context information, which may be referred to as delivery context information, to be made available to scripts running in web pages within a browser on a device.

Context is generally defined as any information that can be used to characterize the situation of an entity. Context parameters may include parameters related to, for example, environmental context, social context, spatio-temporal context, task context, personal context, terminal context, service context, access context, and/or the like. Of these exemplary contexts, environmental context may describe the entities or devices around the user and the environment in which the user and the user's device is located. Spatio-temporal context may define the user's location (e.g., physical or geographical location) in the real world at a certain point in time. Task context may describe information related to on-going tasks or applications being executed. Terminal context may be related to or descriptive of the status and/or capabilities of the user's device. Service context may relate to or be descriptive of services that are available at a particular location and access context may describe the status of network connectivity.

Delivery context may be used to describe a set of characteristics of a device, a network, user preferences and other aspects that may apply to an interaction between the device and an application (e.g., a web application). Aspects of delivery context could be either static or dynamic. Static aspects may include color resolution, display size, keyboard arrangement or other fixed properties of the device. Dynamic aspects may include properties of the device that may change over time such as current battery level, device orientation, device location, other applications running, and numerous other like characteristics.

DCCI may be a mechanism through which applications can access delivery context information using, for example, a Document Object Model (DOM) (which is also W3C specification) like interface. Accordingly, applications can register event listeners on property nodes that initiate events based on property or other changes. In this regard, DCCI provides interfaces for applications that utilize delivery context information. DCCI provides a tree-like representation of context data on a device that can be represented in a hierarchical manner conforming to some standard ontology; e.g., Delivery Context Ontology (DCO). However, even though context representation may be used by applications for adaptation or metadata recording, some applications may use metadata itself rather than context data for achieving the corresponding function associated with an application. For example, instead of context data, a particular application may perform a function on the basis of a version number for particular software or based on the manufacturer of the software. These characteristics may be stored in metadata rather than context information.

Because of inherent relationships that context information may represent, context information may be represented as a tree structure. The tree structure may represent a hierarchical relationship between different context properties in which each property may form a node in the tree structure. DCCI is one example of such a tree structure, but it should be understood that embodiments of the present invention extend beyond this one example and may be extended to many other data structures that specify relationships between data objects and/or how they can be effectively distributed and shared.

Context may be determined, for example, based on a determination of various context parameters. DCCI uses context information to enable adaptation that permits interaction with various applications while considering device context. However, as indicated above, when devices are brought in proximity to each other in certain networks, such as smart spaces, context information, e.g. information regarding device capabilities, may desirably be shared between such devices so that each device can receive some information about the capabilities of the other device. As such, for example, a composite capability tree may be provided that may be distributed to devices in communication via the network. This may be accomplished by the provision of differential information that enables each device to view the composite capability tree by modifying information relating to each device's respective own capability tree. Embodiments of the present invention will be described below in connection with the use of capability profile information defining the current capability tree of a device to be provided from each participating device to enable construction of a composite capability tree.

Figure 1:
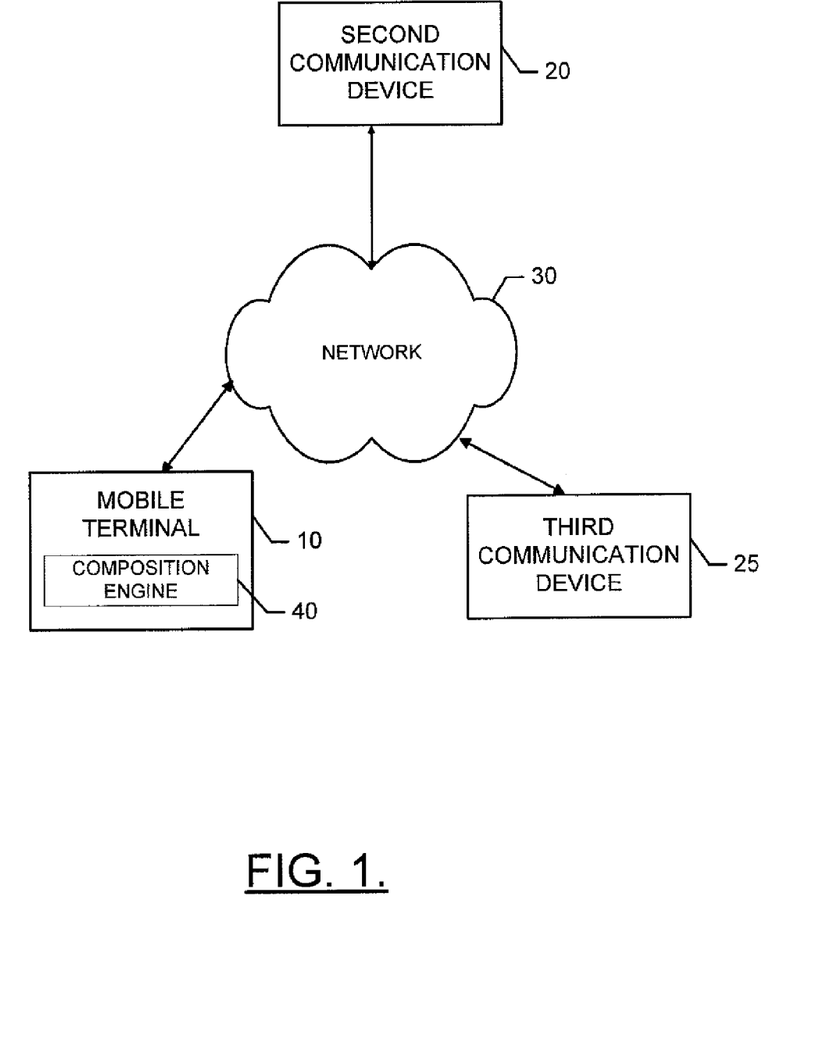
FIG. 1 illustrates a schematic block diagram of a system for providing composite capability information for devices within a distributed network according to an exemplary embodiment of the present invention.

FIG. 1 illustrates a generic system diagram in which a device such as a mobile terminal 10, which may benefit from embodiments of the present invention, is shown in an exemplary communication environment. As shown in FIG. 1, an embodiment of a system in accordance with an example embodiment of the present invention may include a first communication device (e.g., mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ embodiments of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video player, radio, global positioning system (GPS) devices, or any combination of the aforementioned, and other types of voice and text communications systems, can readily employ embodiments of the present invention. Furthermore, devices that are not mobile may also readily employ embodiments of the present invention.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. In some embodiments, the network 30 may be a P2P network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an exemplary embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an exemplary embodiment, one of the devices in the network (e.g., the mobile terminal 10) may be selected as a master device. The master device may be nominated and/or selected based on any suitable practice for determining a master device (e.g., the device with the greatest capability, greatest processing power, and/or the like). The master device may include a composition engine 40 according to an exemplary embodiment. The composition engine 40 may be configured to build a composition of capability trees from the mobile terminal 10 and other devices in the network 30 (e.g., the second and third communication devices 20 and 25).

Figure 2:
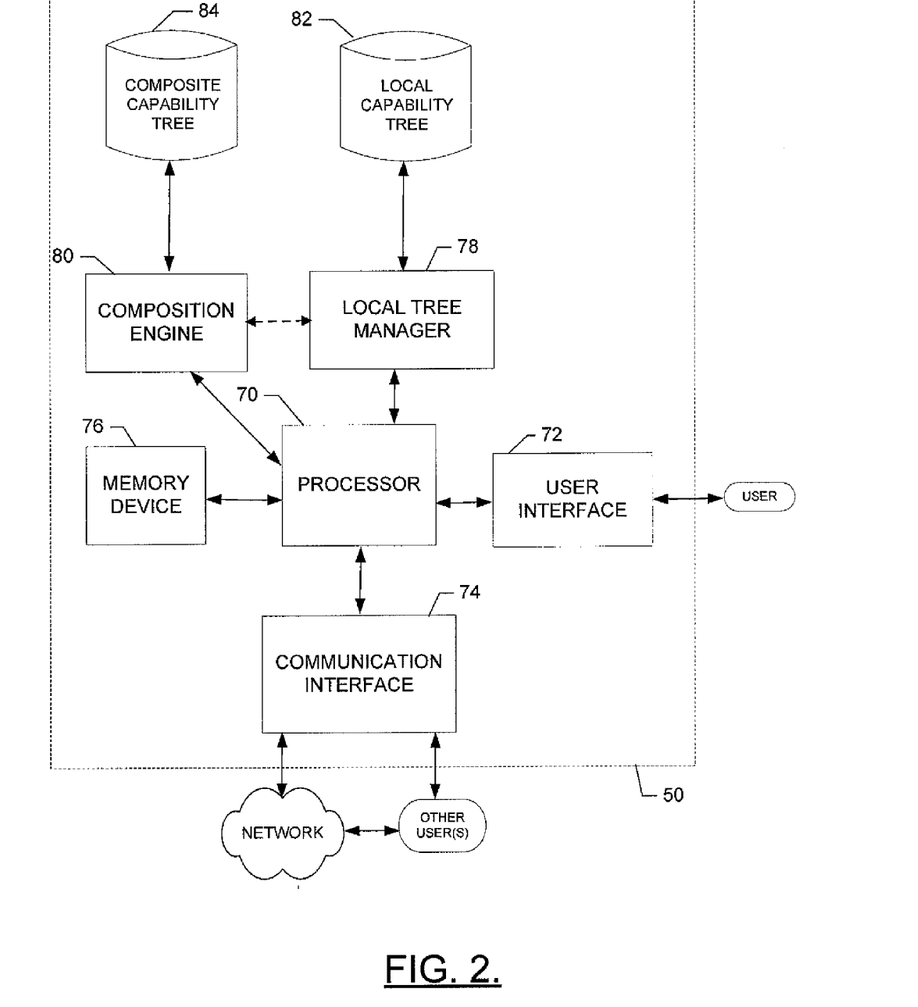
FIG. 2 illustrates a schematic block diagram of an apparatus for providing composite capability information for devices within a distributed network according to an exemplary embodiment of the present invention.

FIG. 2 illustrates a schematic block diagram of an apparatus for enabling the provision of composite capability information according to an exemplary embodiment of the present invention. An exemplary embodiment of the invention will now be described with reference to FIG. 2, in which certain elements of an apparatus 50 for providing composite capability information are displayed. The apparatus 50 of FIG. 2 may be employed, for example, on the mobile terminal 10 (and/or the second communication device 20 or the third communication device 25). However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments. In an exemplary embodiment, the mobile terminal 10 may receive capability tree information from devices in the network 30 and may determine a composite tree in order to provide information to the devices to enable each device to become aware of the composite tree.

Referring now to FIG. 2, an apparatus for providing composite capability information is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, DSL, Universal Serial Bus (USB) or other mechanisms.

The user interface 72 may be in communication with the processor 70 to receive an indication of a user input at the user interface 72 for the user and to provide the processor with a corresponding indication of the user input. The user interface may also provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied at a communication device (e.g., the mobile terminal 10), the user interface 72 may include, among other devices or elements, any or all of a speaker, a microphone, a display, and a keyboard or the like.

In an exemplary embodiment, the processor 70 may be embodied as, include or otherwise control a local tree manager 78 and a composition engine 80 (e.g., composition engine 40). As such, the local tree manager 78 and the composition engine 80 may in some cases each be separate devices, modules, or functional elements. However, in other embodiments, the local tree manager 78 and the composition engine 80 may be embodied within a single device, module, or functional element, such as the processor 70. The local tree manager 78 and the composition engine 80 may each be any means such as a device or circuitry embodied in hardware, software or a combination of hardware and software (e.g., processor 70 operating under software control) that is configured to perform the corresponding functions of the local tree manager 78 and the composition engine 80, respectively, as described below. In some embodiments, communication between the local tree manager 78 and the composition engine 80 may be conducted via the processor 70. However, the local tree manager 78 and the composition engine 80 may alternatively be in direct communication with each other, as indicated by the dashed line in FIG. 2.

The apparatus 50 may be employed in the master device (e.g., the mobile terminal 10), as indicated above. However, in some embodiments, each device (e.g., also the second and third communication devices 20 and 25) may include an instance of the apparatus 50. However, in some cases, in devices not currently acting as the master device, the composition engine 80 may remain dormant or may not exist at all.

The local tree manager 78 may be configured to maintain and/or host a local capability tree 82 for the corresponding device with which the local tree manager 78 is associated; e.g. the device (host device) in which the local tree manager 78 is embodied, such as the mobile terminal 10 in this example. The local tree manager 78 may be configured to update the local capability tree 82 in response to changes in either static or dynamic properties associated with the host device and/or the environment of the host device. In an exemplary embodiment, the local capability tree 82, which may be stored in the memory device 76 in some embodiments, may include a DCCI comprising a DOM based tree representation of context and device property information (both static and dynamic). In some embodiments, when a smart space is entered, or when the host device establishes communication with other devices in a multi-user, multi-device dynamic interaction environment, the local tree manager 78 may be configured to communicate its corresponding local capability tree 82 to the device identified as the master device. If the host device itself is the master device, the local tree manager 78 may communicate its local capability tree 82 internally to the composition engine 80 for combination with the local capability trees of other devices.

Within a smart space environment, several devices and services can interact by providing new interaction services and adaptive applications to users. There may be several smart devices and interaction widgets within a smart environment and users may use those devices and widgets to address and interact with existing applications or new mashups that are possible within such environments. As such, when multiple devices come into proximal contact, an ad hoc smart space may be formed based on combining the individual capabilities of each device. As indicated above, the composition engine 80 may utilize, for example, the World Wide Web Consortium (W3C) defined interface, DCCI that represents the device's system and capability information for building composite trees that show combined capabilities of the devices in the smart space. Thus, the individual local tree managers of each of the individual devices may submit their respective capability trees to the composition engine 80 of the master device to enable the composition engine 80 to generate a composite capability tree 84 through intelligent decision making and through use of participating device specific information with a customized virtual composition tree thereafter being provided from the composite capability tree for each participating device. Moreover, the composite capability tree 84 may be generated without relying on the use of proprietary extensions and/or predefined knowledge of participating devices. As such, embodiments of the present invention may utilize responses from individual devices to describe their capabilities through accepted standards and extensions. By building the composite capability tree 84, embodiments of the present invention may limit the amount of traffic used to build a composite picture of the capabilities of devices within the smart space in an efficient manner.

The composition engine 80 may be configured, e.g., when brought into proximity with other devices and when operating on the master device, to combine the individual DCCI trees of each device with each other to form one composite logical tree structure of capabilities that are available to devices that are in communication via the network 30 (or smart space). For example, the composition engine 80 may be configured to combine local capability trees of each device with each other to form a composite capability tree 84. Thus, applications running on any device may see an expansion in the capability of the corresponding device without necessarily knowing exactly where the newly available properties are resident. The applications may, however, find the resident nature of a particular property by looking at a metadata structure within the object representation in the DCCI tree (e.g., the composite capability tree 84) for the particular property. In an exemplary embodiment, the composition engine 80 may employ a composition algorithm in order to combine the local capability trees of various devices into the composite capability tree 84.

In some exemplary embodiments, the composition engine 80 may include additional functionality, such as may be defined by local policies that can guide composition, by security and privacy policies, by the individual capabilities of each device, by whether nodes need to be substituted, by the protocol stacks that are supported by each device, etc. In this regard, for example, the composition engine 80 may be configured to remove redundant and/or common nodes. As such, for example, in some instances, the composition engine 80 may remove a set of nodes based on such nodes being either redundant or common. Accordingly, the composite capability tree 84 may not have duplicate nodes that may be present in the local capability trees of multiple individual devices. By removing redundant nodes, the composition engine may provide for presentation of relevant nodes without duplication.

In an exemplary embodiment, the composition engine 80 may provide that the removal of a node in one tree does not affect an application that is already listening on the corresponding node. For example, if a particular property (e.g., GPS) is present in two devices, the first device may have an application that is listening on the GPS node of the first device while the second device may also have an application that is listening on the GPS node within the second device. Thus, when the local capability trees of the first and second devices are combined, the composite capability tree 84 may desirably only include one GPS device. However, the operations of applications listening on the first and second devices should not be affected.

Accordingly, the composition engine 80 may be configured such that the composite capability tree 84 may not be pushed to each other device in its entirety. Instead, the composition engine 80 may be configured to communicate differential information to each other device in the network or smart space so that the corresponding other devices may build a local composite capability tree based on the differential information provided. In this regard, for example, the differential information for a particular device may include a node list identifying capabilities to be added to the local capability tree of the particular device in order to generate a local composite capability tree that is reflective of a non-redundant listing of the capabilities of the whole network or smart space, but does not force the particular device to stop listening at a local node even though some other device may have a corresponding capability.

The composition engine 80 of one embodiment may also be configured to deal with other potentially complicating scenarios. In this regard, for example, the composition engine 80 may be configured such that when combining two or more trees together, the devices are not sending data of each node to the composition engine 80. In this regard, since there may be hundreds of nodes in all the devices, processing each to build the composite tree may not be practical in all cases. Security and property management issues may also be taken into account by the composition engine 80 in some instances. In this regard, for example, security and property management may conform to individual security and property management for each property within each local capability tree within each device.

As indicated above, the composition engine 80 may be configured to generate differential information for each respective device so that, although each device may view one logical composite tree, the logical composite tree for each device may be different. In other words, the composition engine 80 may provide differential information in order to provide custom capability information to each device. As such, because each device's local capability tree may have the set of properties that the applications of each respective device were using prior to building the composite tree, the set of properties being used may be retained along with other certain properties that are locally resident on the device with respect to the same properties being remotely available. Accordingly, for example, the composition engine 80 may provide information regarding properties which may be added to the local capability tree of each respective device in order to bring each respective device's local composite capability tree into conformity with the composite capability tree 84 without redundancy, but also without impacting current property usage at each respective device. In an exemplary embodiment, the differential information may be provided to either an instance of the composition engine 80 at each respective device or to the local tree manager 78 of each respective device in order to permit updating of the local capability tree of the device to conform to the capabilities of the composite capability tree 84 by generating the local composite capability tree.

In some embodiments, local properties may not be replaced. As such, even if similar remote properties are available, the local properties used prior to composition may be retained as well as certain properties that are locally resident on the device with respect to the same properties being remotely available. In some embodiments, local properties may only be overridden in situations in which the local properties are deemed less reliable and/or less powerful than corresponding available remote properties by the composition engine 80.

Figure 3A:
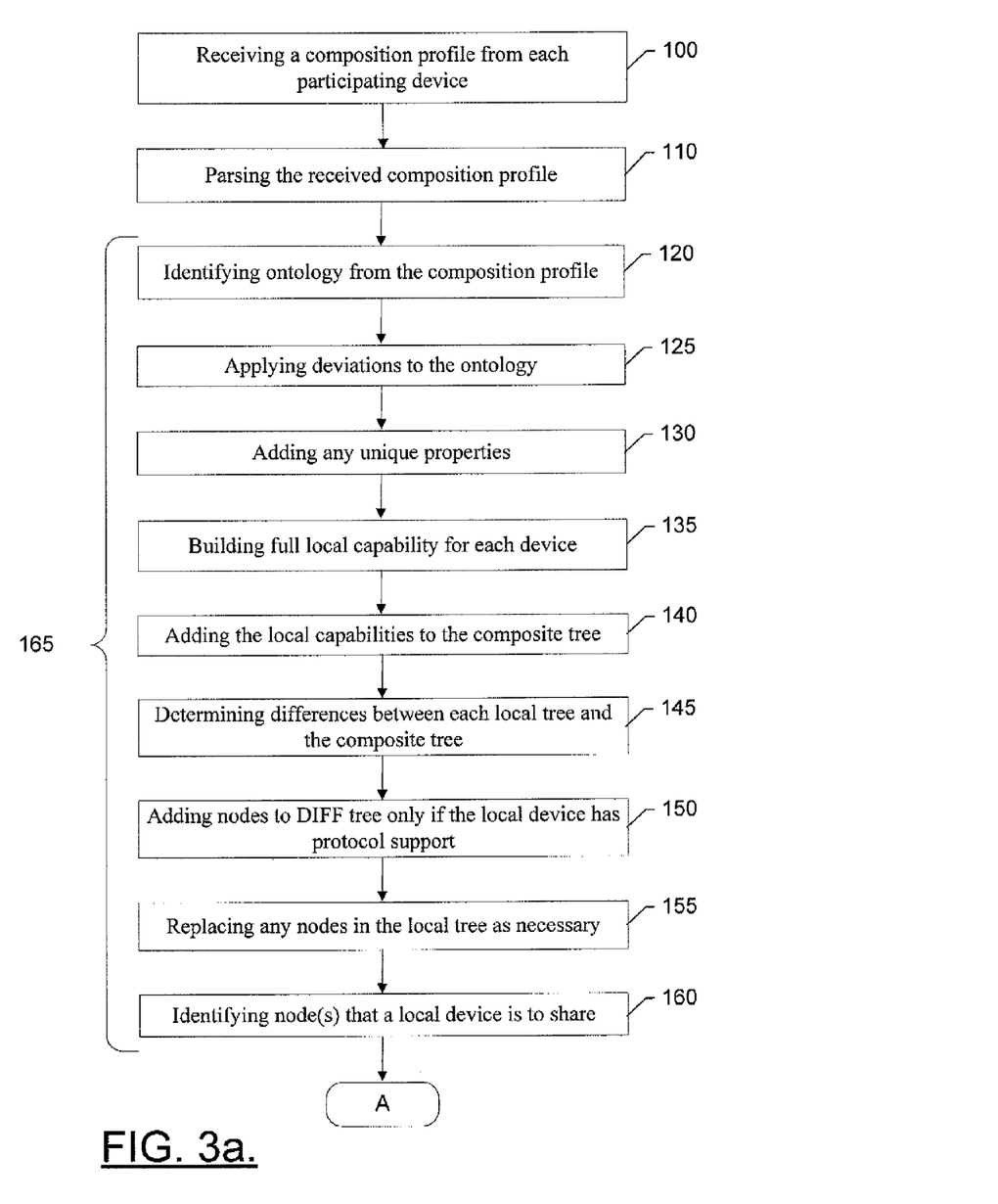
FIGS. 3a and 3b are a flowchart illustrating example operations for providing composite capability information for devices within a distributed network according to an exemplary embodiment of the present invention.
Figure 3B:
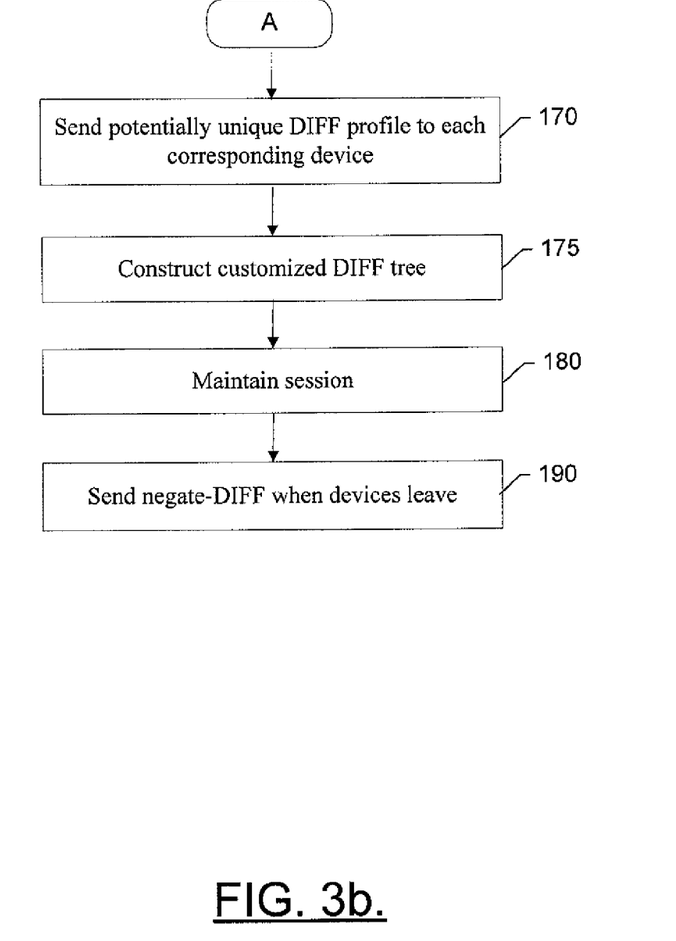

FIGS. 3a and 3b illustrate a block diagram showing various operations performed during composition of the composite capability tree 84 by the composition engine 80 according to an exemplary embodiment of the present invention. In this regard, at operation 100, a composition profile (e.g., the local capability tree 82) may be received from each participating device. In an exemplary embodiment, the composition profile may be an eXtensible Markup Language (XML) file that lists aspects of composition that may be utilized by the composition engine 80 in making decisions with respect to generating the composite capability tree 84 and/or providing differential information to each device. In some cases, a first portion of the composition profile may include a list of nodes in the local capability tree of the corresponding device that consumer applications of the device are currently using (e.g., listening for updates). Meanwhile, a second portion of the composition profile may list a set of protocol stacks that the local device supports. The set of protocol stacks may be used for making decisions on whether to route certain properties through other devices, whether the local device itself is capable of direct subscription or even whether to include certain properties due to lack of protocol support between devices. Such decisions may be useful if the local domain or environment itself supports multiple sessions for certain services that it exposes. A third portion of the composition profile may include a listing of a set of modules of the ontology (e.g., Delivery Context Ontology (DCO)) that the local device supports. A fourth portion of the composition profile may include a listing of a set of deviations and particular value instances of properties within the ontology modules listed above in the third portion of the composition profile. The deviations may be used to compute whether to include similar types of properties that other devices expose. The deviations may be a set of "additional nodes" and/or a set of "not present" nodes defining changes from a standard ontology and may be used to build the set of nodes that are present in the local tree of a device. The full set of nodes that are present in the local tree is built by adjusting the deviations from the standard ontology that is referred to in the composite profile. The composite profile may refer to a set of multiple ontology that certain sets of nodes (forming a subtree within the tree) may support. A fifth portion of the composition profile may list a set of properties that are unique to the device that may not be in the original ontology for delivery context.

At operation 110, the composition engine 80 may parse the composition profile that each device has sent and start to build a "DIFF" tree for each of the profiles that were received. The DIFF tree provides the set of nodes that a device should add to its local tree in order to reflect the composite capability of the multi-device session. The DIFF tree may be different for each device within the session. The DIFF tree for a device may be built by the composition engine by first building the full capability of the local device that sent the composition profile. The full capability is built by getting the modules and properties defined within the ontology that is referenced by the composition profile, as reflected by operation 120. This information is then combined with the deviations listed for that particular device from the standard ontology within the composition profile. See operation 125. The deviations, which are sent in the composition profile, may include modules (e.g., sets of properties that are defined by an ontology) in which there is a deviation from the standard ontology. As such, for example, a device may only need to send a list of deviations from the standard ontology instead of sending the entire set of properties that are present, thereby keeping the composite profile smaller. After having accounted for the deviations, any unique property list that may not fall within any ontology may be added. See operation 130. The deviations and unique property list are used to compose the full capability of the local device that sent the composite profile. See operation 135. Once the full capability is built, this is added to a composite tree after accounting for redundant nodes. See operation 140. Once all the composite profiles from participating devices are received, the final composite tree is constructed. The deviations of each local tree from this main composite tree is then built and added to the individual DIFF tree. See operation 145. When building the DIFF tree, the protocol stacks that each new property supports are considered to determine whether each new property can be supported by the target local device. See operation 150. If a new property cannot be supported, the property (node) is not added to the DIFF tree. If the new property can be supported (as determined, for example, by looking at the protocol stacks supported by target device), then the new property is added. The type of nodes that are added may also depend upon any relevant policies that may apply within the session. In some embodiments, nodes that have the same name and type (for example two GPS nodes) can be added if their metadata information differs. In some cases, certain properties can be tagged within the composite profile as substitutable. Such properties may be compared with similar properties from other profiles and checked in relation to whether to maintain the similar properties for this tree or substitute such properties with properties from other trees. See operation 155. If no substitution is desired or required for a particular node, the particular node may not be included in the DIFF tree. If new addition is deemed appropriate for a particular new node, the new node may be added to the DIFF tree. In the case of substitution, the composition engine 80 may add the new property to the same original XPath address as the one described in the ontology for the corresponding property.

The deviations and unique property list may be noted by composition engine 80 and compared with other profiles sent by participating devices. If a particular property is deemed desirable, the particular property may be added to the DIFF tree for subscription for other nodes. See operation 160. As shown collectively the operations designated 165, a DIFF profile including the differential information for each respective device may be constructed. The DIFF profile may include two parts. The first part of the DIFF profile may describe the tree that a particular local client has to construct in order to get the logical composite tree (e.g., the composite capability tree 84). The second part of the DIFF profile may list a set of nodes that the particular local client is to provide to other clients. Each property in the DIFF profile may include a metadata description that lists how data is to be sent or received by the device to which the DIFF profile is being sent. As such, the second part of the DIFF profile may function as a provisioning section to take into account the protocol stacks that may be included at each individual device. For certain devices, this may involve routing of data through other devices in case a specific protocol stack is not supported. In an exemplary embodiment, the DIFF tree that was created for a client may be serialized in XML format and put into the first part of the DIFF profile. The second part of the DIFF profile may include the XML version of properties for which the client is to serve as a source to other devices.

At operation 170, the composition engine 80 may send a DIFF profile including the differential information customized for each participating device. At the respective participating devices, a customized DIFF tree may be constructed based on the received differential information at operation 175. In some embodiments, the local capability tree of a particular device may also be re-constructed based on substitutions and/or additions carried out. A session between the master device (e.g., the composition engine 80 of the master device) and each participating device may be maintained through polling and paging models at operation 180 and the control channel for sessions may be kept separate from the data channel. At operation 190, once a device goes out of the group, the composition engine 80 of the master device may inform all participating devices or clients by sending a "negate-DIFF" file that may include the nodes that are to be removed from each respective client's logical DCCI tree. The negate-DIFF may only list nodes that have to be removed. As such, the negate-DIFF file may function opposite to the function of the DIFF profile providing the differential information. In some cases, the negate-DIFF file may include or be accompanied by information indicative of a node that may provide a capability that is being removed from the network in response to removal of the capability. As such, the composition node 80 may provide an indication of a backup source for a capability that leaves the network to devices that may have relied upon the capability.

In an exemplary embodiment, information provided to the composition engine 80 by the various participating devices (e.g., the local capability tree of each respective device) may have a relatively consistent format. In this regard, for example, such information may have distinct modules or portions. Thus, for example, a first module or portion of the information provided to the composition engine 80 may include a subset of base properties that are common to all devices. As such, the composition profile may in some cases only indicate that the composition profile follows the subset of base properties provided in the first module while a corresponding section in a deviation area may list any deviation from the base properties that are characteristic of the corresponding device. In some instances, there may be several sub modules and deviations of any standard ontology, such as DCO, that can be defined depending on the class to which a particular device belongs. Each sub module may be defined and addressed based on the class of device and the base properties that belong to each class. The types of classes, number of base sub modules, base properties and deviations that may be part of the composition framework may vary in different instances.

A second module may list or otherwise identify a certain set of properties that belong to a particular class or type of devices. For example, mobile phones may have GSM connection, GPRS, WLAN, etc., while a pocket PC may have only wireless connection capability. Thus, a higher category that differentiates such classes of devices from base properties of the first module may be a part of a higher level second module. Any deviations from the second module by a device belonging to a particular class may be listed under the deviation section for the second module within the composition profile.

A third module may provide a list or identification of device specific properties that may or may not be part of any standard ontology, such as DCO. The third module may also list links to any external ontology to which such properties (e.g., vendor specific properties and/or other essentially not standardized properties) may belong. The third module may also include an extra list including an active list of properties that applications are currently using.

Accordingly, embodiments of the present invention may utilize accepted W3C standards for representing system and environment data utilizing technologies such as, for example, XML, DOM and XPath for creating composite capability information for distribution to devices in smart spaces. Embodiments of the present invention may also utilize the DCO specification or the specification of other standard ontologies to list device properties that are static and dynamic. Accordingly, DCO or other standard ontologies may be modularized and such information may be used to prevent a device from sending all property node information to a composite engine to thereby increase efficiency. Embodiments of the present invention may also support proprietary extensions to device properties and address concerns such as redundant nodes during composition, supporting multi-protocol property sourcing, addition of properties and a customized logical tree for each device. Embodiments may also provide for assurances regarding reducing or eliminating effects of composition on applications operating prior to joining a smart space.

Figure 4:
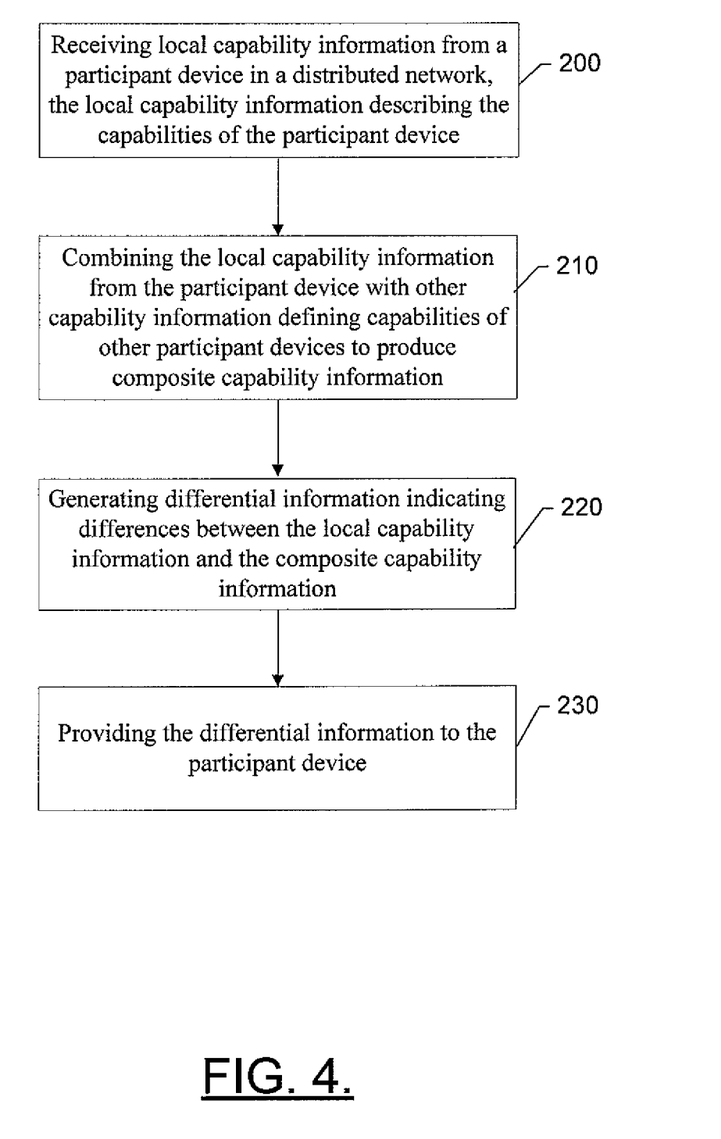
FIG. 4 is a flowchart according to an exemplary method for providing composite capability information for devices within a distributed network according to an exemplary embodiment of the present invention.
Figure 5:
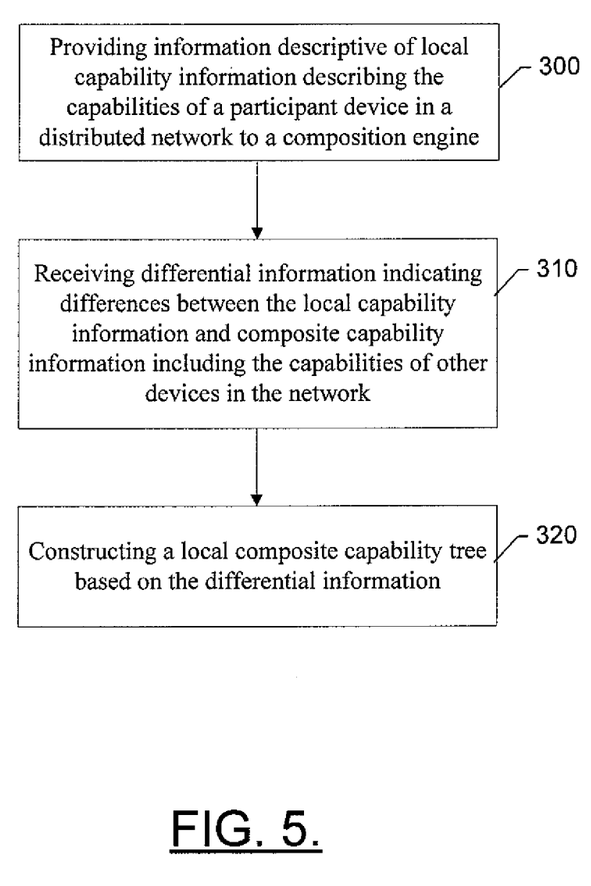
FIG. 5 is a flowchart according to an exemplary method for providing composite capability information for devices within a distributed network according to an exemplary embodiment of the present invention from the perspective of a participant device in a distributed network.

FIGS. 4 and 5 are flowcharts of a system, method and program product according to some exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowcharts block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing composite capability information for devices in distributed networks as illustrated, for example, in FIG. 4 from the perspective of a master device may include receiving local capability information from a participant device in a distributed network in which the local capability information describes the capabilities of the participant device at operation 200. The method may further include combining the local capability information from the participant device with other capability information defining capabilities of other participant devices to produce composite capability information at operation 210 and generating differential information indicating differences between the local capability information and the composite capability information at operation 220. At operation 230, the differential information may be provided to the participant device.

In some embodiments, certain of the operations above may be modified or further augmented as described below. In this regard, for example, generating the differential information may include generating corresponding differential information customized for each respective one of the other participant devices. Moreover, providing the differential information may include providing the corresponding differential information to each corresponding one of the other participant devices. In an exemplary embodiment, receiving local capability information may include receiving information indicative of a set of base properties common to all participant devices, receiving information indicative of a set of properties common to a particular class of devices and/or receiving information indicative of a property that is not part of an ontology, such as DCO. In an exemplary embodiment, providing the differential information may include providing information descriptive of the differences between the local capability information and the composite capability information and providing information indicative of a set of nodes that the participant device is to provide to the other participant devices. As described above, in some cases, generating the differential information may include eliminating active nodes at the participant device from the differential information provided to the participant device, such as in instances in which the active nodes to be eliminated have been deemed to be replaceable as a result of the availability of a better alternative, and/or including information indicative of substitute properties or additional properties to be applied to the local capability information.

In an exemplary embodiment, an apparatus for performing the method of FIG. 4 above may comprise a processor (e.g., the processor 70) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the processor 70, respective ones of the local tree manager 78, the composition engine 80, or an algorithm executed by the processor for processing information as described above.

In another exemplary method, shown in FIG. 5 from the perspective of a participant device that is not the master device, information descriptive of local capability information describing the capabilities of the participant device may be provided from the participant device in a distributed network to a composition engine at operation 300. The method may further include receiving differential information indicating differences between the local capability information and composite capability information including the capabilities of other devices in the network at operation 310. The method may further include constructing a local composite capability tree based on the differential information at operation 320. Any additions or substitutions further indicated by the differential information may then also be applied to the local capability information.

An apparatus for performing the method of FIG. 5 above may comprise a processor (e.g., the processor 70) configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the processor 70, the local tree manager 78, or an algorithm executed by the processor for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a computer processor and memory including computer program code, the memory and the computer program code configured to, with the computer processor, cause the apparatus at least to:
   receive local capability information from a participant device in a distributed network, the local capability information describing the capabilities of the participant device;
   combine the local capability information from the participant device with other capability information defining capabilities of other participant devices to produce composite capability information;
   generate differential information indicating differences between the local capability information and the composite capability information; and
   provide the differential information to the participant device.

2. The apparatus of claim 1, wherein the memory and computer code are configured to, with the processor, cause the apparatus to generate the differential information by generating corresponding differential information customized for each respective one of the other participant devices.

3. The apparatus of claim 2, wherein the memory and computer code are configured to, with the processor, cause the apparatus to provide the differential information by providing the corresponding differential information to each corresponding one of the other participant devices.

4. The apparatus of claim 1, wherein the memory and computer code are configured to, with the processor, cause the apparatus to receive local capability information by receiving information indicative of a set of base properties common to all participant devices.

5. The apparatus of claim 1, wherein the memory and computer code are configured to, with the processor, cause the apparatus to receive local capability information by receiving information indicative of a set of properties common to a particular class of devices.

6. The apparatus of claim 1, wherein the memory and computer code are configured to, with the processor, cause the apparatus to receive local capability information by receiving information indicative of a property that is not part of a delivery context ontology.

7. The apparatus of claim 1, wherein the memory and computer code are configured to, with the processor, cause the apparatus to provide the differential information by providing information descriptive of the differences between the local capability information and the composite capability information and providing information indicative of a set of nodes that the participant device is to provide to the other participant devices.

8. The apparatus of claim 1, wherein the memory and computer code are configured to, with the processor, cause the apparatus to generate the differential information by eliminating active nodes at the participant device from the differential information provided to the participant device.

9. The apparatus of claim 1, wherein the memory and computer code are configured to, with the processor, cause the apparatus to generate the differential information by including information indicative of substitute properties or additional properties to be applied to the local capability information.

10. The apparatus of claim 1, wherein the memory and computer code are configured to, with the processor, cause the apparatus to receive local capability information from the participant device by receiving information indicating deviations from a standard ontology.

11. A computer program product comprising at least one nontransitory computer-readable storage medium having computer-executable program code instructions stored therein, the computer-executable program code instruction comprising:
    program code instructions for receiving local capability information from a participant device in a distributed network, the local capability information describing the capabilities of the participant device;
    program code instructions for combining the local capability information from the participant device with other capability information defining capabilities of other participant devices to produce composite capability information;
    program code instructions for generating differential information indicating differences between the local capability information and the composite capability information; and
    program code instructions for providing the differential information to the participant device.

12. The computer program product of claim 11, wherein program code instructions for generating the differential information include instructions for generating corresponding differential information customized for each respective one of the other participant devices.

13. The computer program product of claim 11, wherein program code instructions for receiving local capability information include instructions for receiving information indicative of a set of base properties common to all participant devices.

14. The computer program product of claim 11, wherein program code instructions for receiving local capability information include instructions for receiving information indicative of a set of properties common to a particular class of devices.

15. The computer program product of claim 11, wherein program code instructions for receiving local capability information from the participant device include instructions for receiving information indicating deviations from a standard ontology.

16. A method comprising:
    receiving local capability information from a participant device in a distributed network, the local capability information describing the capabilities of the participant device;
    combining, via a computer processor, the local capability information from the participant device with other capability information defining capabilities of other participant devices to produce composite capability information;
    generating differential information indicating differences between the local capability information and the composite capability information; and
    providing the differential information to the participant device.

17. The method of claim 16, wherein generating the differential information comprises generating corresponding differential information customized for each respective one of the other participant devices.

18. The method of claim 16, wherein receiving local capability information comprises receiving information indicative of a set of base properties common to all participant devices.

19. The method of claim 16, wherein receiving local capability information comprises receiving information indicative of a set of properties common to a particular class of devices.

20. The method of claim 16, wherein receiving local capability information from the participant device comprises receiving information indicating deviations from a standard ontology.

* * * * *